United States Patent Office 3,737,487
Patented June 5, 1973

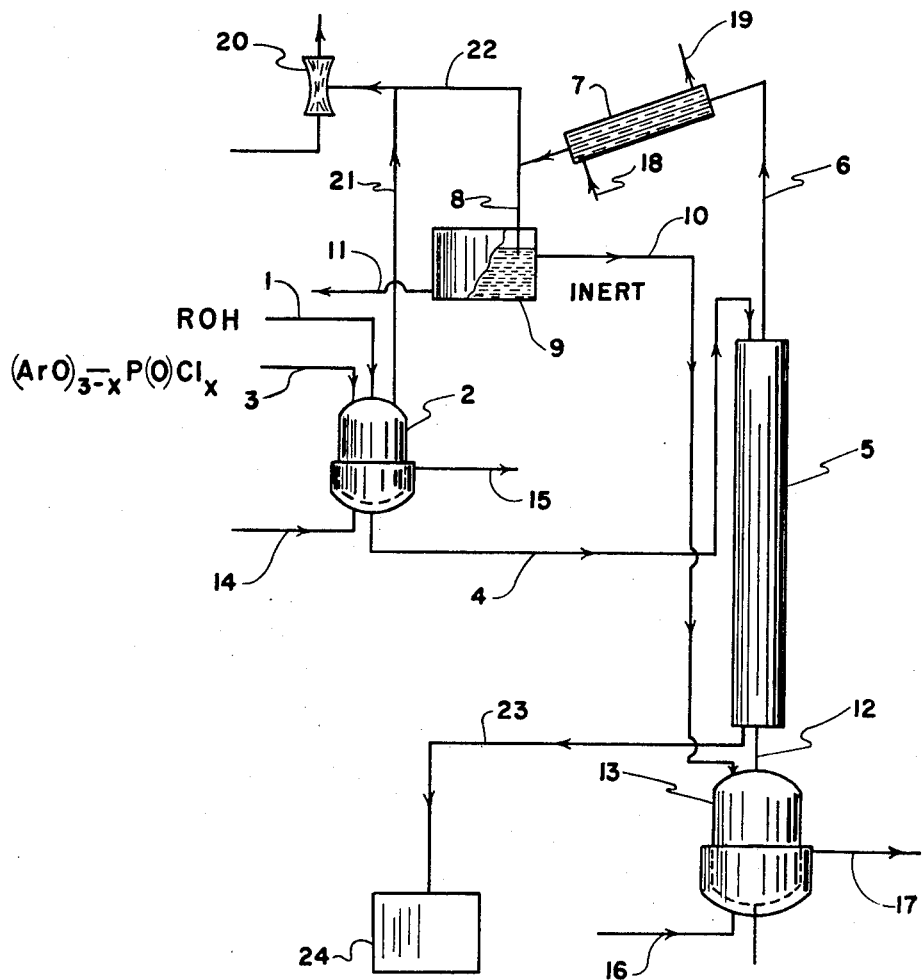

3,737,487
PROCESS FOR PREPARING ARYL ALKYL
PHOSPHATES
George M. Nichols, Chicago, Ill., assignor to Stauffer
Chemical Company, New York, N.Y.
Continuation-in-part of application Ser. No. 766,898,
Oct. 11, 1968. This application Aug. 19, 1970, Ser.
No. 65,353
Int. Cl. C07f 9/08, 9/12
U.S. Cl. 260—973                                     12 Claims

ABSTRACT OF THE DISCLOSURE

Aryl alkyl phosphates are prepared by admixing an aryl phosphorohalidate with an alcohol, passing the mixture downwardly through a column containing an upwardly flowing stream of vaporized inert solvent, the temperature within the column being at a level conducive to reaction between the aryl phosphorohalidate and the alcohol, and removing a low boiling mixture of alcohol, solvent and hydrogen halide from the top of the column and recovering the desired aryl alkyl phosphate ester from the bottom.

CROSS REFERENCE TO RELATED APPLICATION

This application is a continuation-in-part of applicant's earlier filed copending application, Ser. No. 766,898, filed Oct. 11, 1968, now abandoned.

This invention relates to an improved process for the manufacture of aryl alkyl phosphates, and especially to an improved and continuous process for the large scale commercial manufacture of monoalkyl diaryl phosphate esters.

Methyl diphenyl phosphate has long been known to be useful as an additive for gasoline. However, until now there has been no economically attractive process for the large scale manufacture of this compound. An important reason why known processes have not been adaptable to commercial practice is because of the poor yields of product resultant from the use of these methods. The best yields of methyl diphenyl phosphate by any of the hithertofore known processes have been in the order of about 70 percent.

A well known theoretically possible reaction for the production of methyl diphenyl phosphate is the reaction of methanol with diphenyl phosphorochloridate according to the following formula:

(I)

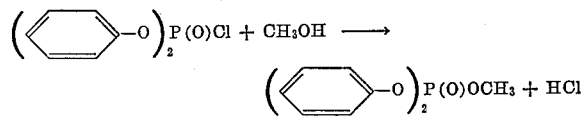

Unfortunately, in actual practice this reaction does not yield methyl diphenyl phosphate in the desired stoichiometric quantities. A principal problem encountered in this process is the very undesirable adverse side reaction of the methyl diphenyl phosphate with the by-product hydrogen chloride according to the following reaction scheme:

(II)

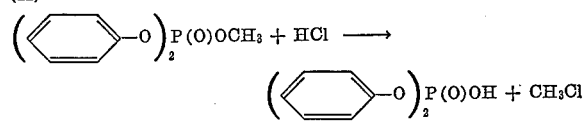

The methyl substituent of the phosphate ester is far more susceptible to this adverse cleavage reaction with hydrogen chloride, and this reaction occurs as long as the hydrogen chloride and the methyl substituted phosphate are in contact. It is particularly acute during operations relating to the separation of the products. To make matters worse, the cleavage reaction is extremely difficult to control and it even occurs at temperatures as low as 0° C. Consequently, separation of hydrogen chloride from the reaction mass is an extremely difficult operation and no practical way has heretofore been found to substantially reduce the undesirable cleavage of the methyl group from the methyl diphenyl phosphate so as to facilitate large scale commercial manufacture of this compound.

Another very serious cleavage problem is produced by unesterified P—Cl bonds within the diaryl phosphorochloridate which cannot be separated from the final product by any known practical methods. Under conditions required for the separation of reaction products, any reactant which is not completely esterified condenses with the cleavage acids produced in accordance with the reaction II (forming P—O—P bonds) to liberate further hydrogen chloride. Thus, the potentially esterifiable diaryl phopshorochloridate is not only prevented from forming the desired alkyl diaryl phosphate but in addition produces still more hydrogen chloride which, in turn, reacts with formed alkyl diaryl phosphate to produce even more cleavage acids and more alkyl chlorides. This reaction sequence is symbolized as follows:

(III)

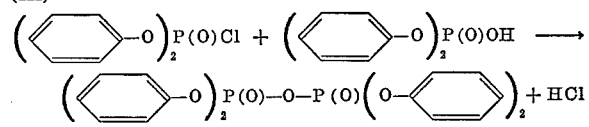

(IV)

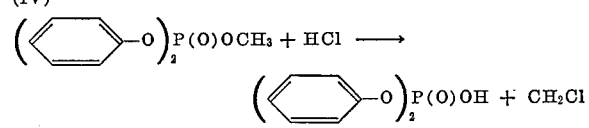

These adverse reactions, symbolized by Equations II, III and IV are particularly acute under the necessary conditions imposed by normal distillation to effect separation of the reaction mass to its component parts. For example, it is known in the prior art that when the separation of hydrogen chloride from the alkyl diaryl phosphate is attempted, even under mild conditions, that the yield of product decreases considerably even when the hydrogen chloride content in the feed is as little as 10 mole percent. Thus, a major and significant factor contributing to the failure of utilizing the alcohol-diaryl phosphorochloridate reaction in a commercial process is the inability to obtain a practical method for separating the product of the reaction particularly hydrogen chloride from the final product.

Another serious problem is that of producing an essentially chloride-free product when this material is to be used as a gasoline additive. Because of the extreme corrosiveness of such chlorides on engine parts, it is absolutely essential that the chlorides be maintained at very low level.

Various attempts have been made in the prior art to overcome the aforementioned problems. It has been attemped to conduct the ester formation process in a packed column wherein the diaryl phosphorochloridate is fed to the top of the column and vapors of the alcohol used for the ester formation are caused to rise from the bottom of the column (U.S. Pat. 3,042,697). While this is a convenient manufacturing method, reported yields are below 60% which makes the process somewhat uneconomical from a manufacturing standpoint.

Workers in the prior art have also disclosed methods of stripping the hydrogen chloride and the alcohol from a reaction mixture of phosphorus oxychloride and methanol by introducing the reaction mixture into the top of a column containing a refluxing inert solvent which acts as a stripping solvent for the alcohol and the hydrogen chloride. This type of process is illustrated in U.S. Pat. 3,076,419 and, in a modified form, in a complete process operation in U.S. Pat. 3,053,875. While these methods are highly effective for stripping HCl and solvents from a reaction mixture, they do not encompass the problem of avoiding HCl cleavage of the alkyl group of the alkyl diaryl phosphate so as to prevent as much as possible the formation of undesirable by-products.

As would be obvious, the foregoing problems become doubly acute in forming dialkyl aryl phosphate esters due to the presence of increased quantities of alcohol and hydrogen chloride.

The present invention provides a new and improved method of preparing alkyl aryl phosphates from alcohols and aryl phosphorohalidates which method is characterized in general by high yields of product. Unexpectedly, it has been found that exceptionally high yields of over 90% can be obtained for the lower alkyl.

In accordance with the present invention, there is provided an improved process for the preparation of alkyl aryl phosphate esters in high yield which comprises forming a mixture of aryl phosphorohalidate and an alcohol, passing the so-formed mixture downwardly through a column containing an upwardly flowing stream of vaporized inert solvent, maintaining the temperature within the column at a level conducive to the reaction between the aryl phosphorohalidate and the alcohol, removing the inert solvent, excess alcohol and by-product hydrogen halide from the top of the column and recovering the desired alkyl aryl phosphate ester from the bottom of the column. This process provides high product yields and especially high yields of over 90% and generally over 95% for the lower alkyls in a simple and economic manner.

The aryl phosphorohalidate compounds used in the present invention can be represented by the formula:

(V)  $(ArO)_{3-x}-)P(O)Hal_x$ wherein Ar is an aryl radical, Hal is a halogen selected from the group consisting of chlorine, bromine, and idoine, and $x$ is 1 or 2. The term "aryl" as used herein is intended to include primarily aromatic compounds having no more than two fused rings. The aryl group is preferably limited to one or single ring systems. Aryl is also intended to include substituted ring systems which substituents do not affect the essential reactivity or character of the group. Such groups include any inert or non-reactive substituent and can be illustrated by alkyl groups of from 1 to 10 carbons, halogens, ether and thioethers groups, esters groups, keto groups, and the like. These are given as illustrative and the present invention is not intended to be limited thereto. Examples of such compounds are phenyl phosphorodichloridate, phenyl phosphorodibromidate, phenyl phosphorodiiodate, tolyl phosphorodichloridate, naphthyl phosphorodichloridate, diphenyl phosphorobromidate, diphenyl phosphorochloridate, ditolyl phosphorobromidate, phenyl naphthyl phosphoroiodiate and the like. Preferably, the aryl group is phenyl tolyl or xlyl and the halogen moiety is chlorine. It has been found that diphenyl phosphorochloridate is a particularly effective reactant for use in the process of the present invention.

The alcohol which is employed in the process of this invention can be defined as one selected from the group of alcohols represented by the following structural formula (VI)  ROH wherein R can be alkyl and substituted alkyls such as cycloalkyl, alkoxyalkyl, arylalkyl, haloalkyl, alkenyl, akyny, hydroxyalkyl, etc. The invention is intended to include all $C_1-C_{20}$ alcohols, where the alcoholic OH group is attached to an aliphatic carbon atom. Examples of alcohols which can be used in the process of the present invention are: methyl, ethyl, propyl, isopropyl, butyl, amyl, isooctyl, 2-ethylhexy, nonyl, decyl, hendecyl, dodecyl, tridecyl, tetradecyl, pentadecyl, hexadecyl, octodecyl, nonadecyl, eicosyl, and the isomeric forms of these alcohols as well as benzyl, 2-methoxyethyl, 2-ethoxyethyl, 2-butoxyethyl, cyclohexyl, chloroethyl, ethylene, glycol, propylene, glycol, 1,3-propanediol and the like. The thioether alcohols such as ethyl thioethanol are also intended to be included within the definition of the term alcohol. These can be broadly defined as RxSRy—OH alcohols wherein the R groups are carbon chains of from 1 to 4. Preferably, the alcohol is a lower alkyl alcohol of from 1 to 4 carbon atoms and more preferably methanol.

For reaction of the aryl phosphorohalidate with the alcohol it is desirable to use at least a stoichiometric amount of alcohol e.g., the number of moles equivalent to the numerical value of $x$ in the Formula V. It is preferred to use an excess of alcohol in the reaction. At least 10% to 20% excess is necessary in most cases to obtain good yields and, preferably, large excesses of above 100% and more preferably from about 150% to about 200% are used.

The process of the present invention can be better described by reference to the flow diagram in FIG. 1 which illustrates a preferred embodiment of the present invention. The process will be illustrated using the preferred aryl phosphorochloridate.

An excess of alcohol is first charged through line 1 into jacketed mixing chamber 2. This mixing chamber is suitably equipped with an agitator and the temperature of the charge may be controlled by means of a cooling liquid entering the jacket through line 14, and leaving through line 15. Aryl phosphorochloridate is then added at a controlled rate through line 3. The temperature during addition is preferably held between −10° C. and 60° C. and more preferably between −10° C. and 10° C. Any evolved HCl formed during the addition is vented through line 21. The admixed reactants are then passed continuously through line 4 into the top of fractionating column 5. In column 5, the temperature is maintained at a level conducive to the reaction between the aryl phosphorochloridate and the alcohol. As the aryl phosphorochloridate and the alcohol react, the by-product HCl along with any excess alcohol is immediately stripped from the alkyl aryl phosphate ester by an upwardly flowing stream of vaporized inert solvent. The vaporization of the inert solvent is easily accomplished by means of a jacketed reboiler 13. Heat for this operation is supplied by a heating liquid entering the jacket through line 16 and leaving through line 17, and the vaporized inert solvent is supplied to the column 5 through line 12. The stripped product, which has a higher boiling point than the reactants or the stripping solvent falls to the bottom of the column where it is passed out through line 23 into collecting tank 24. The excess alcohol, HCl and inert solvent pass out of the top of the column through line 6 into condenser 7. This condenser is cooled by means of a liquid entering the cooling jacket through line 18 and leaving through line 19. The condensed alcohol and inert solvent pass through line 8 into separator 9. By-product HCl escapes through line 22 which optionally can be connected to a vacuum source 20 and/or a recovery system. In the separator, if one of the preferred alcohol-immiscible inert solvents is used, the condensate separates into two layers. The condensed alcohol saturated with HCl normally forms the bottom layer and is withdrawn through line 11. The inert solvent is drawn off the top through line 10 and returned for re-use to the reboiler 13.

It will be obvious from an examination of the process and equipment that the process of this invention can be run either continuously or batch-wise. It is also possible to run the column on a continuous basis and add the admixture of reactants batch-wise. In this event, two mixing chambers can be used to feed the same column.

The reactants, e.g., the alcohol and the aryl phosphorohalidate, may partially react upon admixture. The completion of the esterification reaction is accomplished on the column when the admixture is introduced therein. Preferably, the reaction mixture is held in the mixing chamber for from about 2 hours to about 6 hours and preferably 2–4 hours for the lower $C_1$–$C_4$ alkyls. After holding in the mixing chamber, the reaction mixture which may contain about 80% product (in the case of the $C_1$–$C_4$ lower alkyl alcohol) is conducted to the column where the esterification reaction is completed.

The cleavage reaction between the by-product HCl and the alkyl aryl phosphate is a temperature dependent reaction. It has been found that the cleavage reaction proceeds rapidly enough at 20° C. for the $C_1$–$C_4$ lower alkyl products to cause significant product loss, but at temperatures below 10° C. the cleavage rate is significantly reduced. Since the initial reaction between the lower alkyl alcohol and the aryl phosphorohalidate is exothermic, it is preferred that the temperature of the reaction mixture be maintained with cooling at a temperature below 10° C. and preferably between about 0° and 5° C. during the addition of the aryl phosphorohalidate to the alkanol so as to reduce the degree of side reaction taking place. Variations in the mixing temperature can be made for the higher alcohols which are less susceptible to the HCl attack. In the case of the higher alcohols, it may even be advantageous to warm the reaction mixture slightly to effect partial reaction as the reactivity rate of these higher alcohols is less than that of the lower alkyl alcohols. Temperatures above about 90° C. and preferably above 60° C. should be avoided as the possibility of hydrolysis increases as the reaction proceeds and the higher temperatures are conducive to hydrolysis.

The inert solvent which is used in the process of the present invention is one which is completely inert with respect to the reactants and the products and by-products of the reaction. The preferred type of inert solvent for the $C_1$–$C_4$ lower alkyl alcohols is a low boiling liquid which forms an azeotrope with excess alcohol and by-product HCl and, preferably, which is immiscible with the hydrogen chloride saturated excess alcohol after condensation of the azeotropic vapors.

Among the inert solvents which can be used in the present invention are toluene, which forms suitable azeotropes with methanol, ethanol, propanol, and sec-butanol; xylene, which forms suitable azeotropes with normal and isobutanol; benzene which forms azeotropes with methanol, ethanol, iso-propanol, and tert-butanol; and chlorobenzene, which forms azeotropes with n-propanol and n- and iso-butanol.

Other inert solvents which can be used include ethers, both cyclic and acyclic such as:

Cyclic ethers:
    tetrahydrofuran
    furan
    byram
    N-methyl morpholine
    thioxane
    dioxane
    dioxalane Acyclic ethers:
    diethyl ether
    dibutyl ether
    diisopropyl
    di-sec-butyl
    dibenzyl
    diphenyl
    anisole aliphatic hydrocarbons (acyclic and cyclic) such as $C_4$–$C_{16}$ alkanes:

Acyclic saturated hydrocarbons (liquid):
    n-hexane
    n-pentane
    iso-octane
    n-heptane
    isopentane
    isobutane
    2,2,4-trimethylpentane Cyclic saturated hydrocarbons:
    cyclohexane
    cyclopentane
    decalin
    tetralin
    methylcyclohexane aromatic hydrocarbons which further include:
    benzene    para-cymene
    toluene    pseudocumene
    xylene    tert-butylbenzene
    cumene    methylnaphthalene
    ethylbenzene and halogenated hydrocarbons such as:
    perchloroethylene    carbon tetrachloride
    trichloroethane    chloroform
    chlorobenzene    methylene dichloride The amount of inert solvent vapor present in the column can vary considerably depending on the amount of excess alcohol, azeotrope proportions, etc. Generally, an amount in the range of one to five times based on liquid volume of the inert solvent to the amount of excess alcohol has been found satisfactory. Preferred proportions can be easily determined in each instance according to the product being made and the equipment being used. The selection of any inert solvent is dependent on the temperature which is desired to be maintained within the column. Generally, to effect an efficient reaction between non-reacted phosphorohalidate and methanol (and the alcohol) on the column requires a temperature within the column of between about 20° C. and about 180° C. The temperature of the vaporized solvent can also be controlled by the pressure maintained within the column. While it is more desirable to operate the column at atmospheric pressure for simplicity of the processing equipment, reduced pressure can also be used if it is desired to lower the temperature at which the inert solvent vaporizes.

As the purpose of the refluxing hydrocarbon solvent is to remove the HCl before it can react with the product phosphate ester, it is preferred that the column be of such a size and length and the solvent flow be at such a rate that all the HCl is driven from the column not allowing any to reach the product which collects at the bottom of the column.

While the column containing the vaporized inert solvent can be a hollow column, it is preferred that the column be of the packed column type. The packing, which can be of any type which is inert to the reactants and which establishes efficient contact between the reactants, can include such materials as glass helices, Raschig rings, ceramic chips, etc. In order to promote the reaction and permit free flow of reactants and product throughout the column, the packing must be uniformly distributed, and, in addition, the amount of free space relative to the packing should be maintained within the ratio of about 2:1 to 5:1 and preferably about 4:1. If a catalyst, such as zinc chloride or magnesium chloride is desired to be used within the column, the packing can contain or be coated with such catalyst as desired. Other inert acidic heterogeneous catalyst systems such as a silica gel, an acidic alumino silicate or molecular sieve promoted with $TiO_2$, $SnO_2$, ZnO as well as a dehydrated acidic ion exchange resin could also be used. These catalyst systems could comprise the column packing or be a part of the lower portion of the packing to expedite completion of the alkylation reaction. Quaternary ammonium halides could also be used as catalysts. A catalyst such as those enumerated above could also be present in the mixing chamber if desired.

The process of the present invention is illustrated in the examples which follow.

EXAMPLE 1

102.7 grams of diphenyl phosphorochloridate is added with stirring to 22 grams of methanol at 0° C. over a 47 minute period. The admixing chamber is continuously cooled to maintain the temperature therein at 0° C. The reaction mixture is held in the admixing chamber at 0° C. for an additional 30 hours. The mixture is then introduced into the top of a packed column having an upwardly flowing stream of toluene therein. The mixture is added at a rate of about 2 to about 2.5 milliliters per minute and the vapor temperature of the toluene is between about 70° C. and about 90° C. Heating is continued for 8 minutes after addition is complete. An azeotropic mixture of toluene, methanol and HCl is removed from the top of the column and product collected at the bottom. The product, which contains some toluene, is placed in a separating funnel to which is added 30 milliliters of toluene and 38 milliliters of a 10% $Na_2CO_3$ solution. After shaking, the lower aqueous layer is drawn off and the upper product layer is again washed with $H_2O$. After shaking the lower product layer is drawn off and distilled at 51° C. under 0.08 mm. Hg pressure leaving 67 grams of product (92.3% yield). The product is a slightly acid product which is void of chlorine.

The processes of the present invention can also be accomplished utilizing admixtures of aryl phosphorochloridates such as the mono-, di- and triphenyl derivatives of phosphorus oxychloride. These admixtures are generally formed in the preparation of the diaryl compound such as diphenyl phosphorochloridate from phenol and phosphorous oxychloride. The following examples illustrate the process of the present invention utilizing such admixtures and the procedure of Example 1.

alcohol was recovered (93.5% of the theoretically unreacted alcohol). The crude product weighed 153 grams (78% yield) with an index of refraction of $n_D^{25}=1.4848$. Infrared analysis confirmed the presence of the product. Numerous isomeric forms of isodecyl diphenyl phosphate were formed corresponding to the many isomeric forms of the isodecyl alcohol initially present in the industrial isodecyl alcohol starting material.

It is to be noted that attempts to distill the crude isodecyl diphenyl phosphate in conventional distillation equipment led to decomposition of the product. Apparently distillation of the crude product must be accomplished using different procedures, such as by using a molecular still and ultra vacuum. However, purity of the final product is sufficiently high so that such procedures would be unwarranted and unnecessary in an industrial operation.

As can be seen from the foregoing examples, the process of the present invention provides an improved method of preparing aryl alkyl phosphate esters and particularly diphenyl methyl phosphates in high yields.

The invention is defined in the claims which follow.

What is claimed is:

1. An improved process for the preparation of aryl alkyl phosphate esters of the formula:

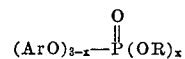

wherein Ar is an aryl radical of no more than two fused

TABLE I

| Example | Intermediate in percent by weight | | | | Percent excess $CH_3OH$ | Reaction | | Percent Total product yield | $Na_2CO_3$ wash solution percent | Product in percent by weight | | | Percent yield methyl diphenyl phosphate** |
|---|---|---|---|---|---|---|---|---|---|---|---|---|---|
| | Amount in grams | Mono phenyl | Di phenyl | Tri phenyl | | Time, hours | Temp., ° C. | | | Mono phenyl | Di phenyl | Tri phenyl | |
| 2 | 134.3 | 10.7 | 76.5 | 12.8 | 100 | 3.5 | 0 | 93.8 | 0 | 12.0 | 76.0 | 12.0 | 93.8 |
| 2A | 134.3 | 10.7 | 76.5 | 12.8 | 100 | 3.5 | 0 | 92.3 | 10 | 10.5 | 77.5 | 12.0 | 92.3 |
| 3 | 134.3 | 11 | 77 | 12 | 100 | 4.0 | 0 | 99.7 | 0 | 9.5 | 77.3 | 13.2 | 98 |
| 3A | 134.3 | 11 | 77 | 12 | 100 | 4.0 | 0 | 87.2 | 10 | 8.5 | 78.0 | 13.5 | 86 |
| 4 | 134.3 | 10.7 | 76.5 | 12.8 | 200 | 4.4 | 0 | 99.4 | 0 | 19.5 | 72.4 | 8.1 | |
| 4A | 134.3 | 10.7 | 76.5 | 12.8 | 200 | 4.4 | 0 | 89.7 | 20 | 19.2 | 73.7 | 7.1 | |
| 5 | 134.3 | 11 | 77 | 12 | 200 | 3.0 | 0 | 87.8 | 20 | 16.2 | 75.0 | 8.8 | |
| 5A | 134.3 | 11 | 77 | 12 | 200 | 3.0 | 0 | 94.5 | 5 | 17.0 | 75.0 | 7.5 | |
| 6 | 141.5 | 4.8 | 84.0 | 11.2 | 200 | 3.7 | 0 | "102.3" | 0 | | | | |
| 6A | 141.5 | 4.8 | 84.0 | 11.2 | 200 | 3.7 | 0 | 100.0 | 5 | | | | |
| 7 | 134.3 | 11 | 77 | 12 | 200 | 5.0 | 0 | 100 | 0 | | | | |
| 7A | 134.3 | 11 | 77 | 12 | 200 | 5.0 | 0 | 80 | 5 | | | | |
| 8 | 134.3 | 11 | 77 | 12 | 200 | 3.5 | 0 | 98.0 | 0 | | | | |
| 8A | 134.3 | 11 | 77 | 12 | 200 | 3.5 | 0 | 50.3 | 15 | | | | |
| 9* | 134.3 | 10.7 | 76.5 | 12.8 | 100 | 3.5 | 0 | 99.1 | 0 | 9.5 | 78.0 | 12.5 | |
| 9A | 134.3 | 10.7 | 76.5 | 12.8 | 100 | 3.5 | 0 | 86.3 | 10 | 8.5 | 79.5 | 12.0 | |

* Reaction mixture feed to side of column.
** Percent based on initial input of diphenyl phosphorochloridate.

EXAMPLE 10

134.2 grams (0.5 mole) of diphenyl phosphorochloridate is added dropwise to 237 grams (1.5 moles—200% excess) of isodecyl alcohol with stirring at 5° C. over a 4¾ hour period. The mixing vessel was equipped with a HCl water trap. The isodecyl alcohol was an industrial grade and contained some isomeric forms of the alcohol. The temperature of the mixture was maintained at 5° C. and held over night. A weight gain in the HCl trap was not observed even when the solution was allowed to warm up to room temperature. 380 milliliters of the above prepared and described reaction mixture was added dropwise over a 10 hour period (0.63 mililiter per minute) to the top of a 3 foot by 1 inch column packed with ¼ inch glass helices. The column also contained refluxing n-heptane (B.P. 98° C.) from a pot at the bottom of the column charged with 400 milliliters of heptane. The reaction occurred on the column as evidenced by the evolution of HCl vapors which were absorbed in an HCl water trap. 12 grams of HCl (18.3 grams theory) was absorbed. The crude product was washed once with 100 milliliters of water, twice with 100 milliliters of a 2% sodium carbonate solution and twice with water. The solvent was removed by distilling the product solvent mixture through a 6 inch by 1 inch column packed with ¼ inch glass helices. 390 milliliters of heptane (98%) was recovered. 147 grams of isodecyl rings, R is a $C_1$ to $C_{20}$ alkyl radical and $x$ is an integer of 1 or 2 comprising (a) premixing an aryl phosphorohalidate of the formula:

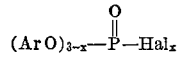

wherein Ar is as defined above, Hal is a halogen of the group consisting of chlorine, bromine and iodine, with an alcohol of the formula

wherein R is as defined above in a molar quantity at least equal to $x$ at a temperature below about 10° C.

(b) passing the so-formed mixture downwardly through a column containing an upwardly flowing stream of vaporous organic solvent inert to the reaction selected from the group consisting of cyclic and acyclic ethers, cyclic and acyclic aliphatic hydrocarbons, aromatics hydrocarbons, and halogenated hydrocarbons;

(c) maintaining the temperature within the column at a level of between about 20° C. to about 180° C. which temperature is conducive to the reaction between said aryl phosphorohalidate and said alcohol;

(d) removing a low boiling mixture of said alcohol, said solvent and hydrogen halide from the top of said column and recovering aryl alkyl phosphate ester from the bottom of said column.

2. A process as recited in claim 1 wherein said premixing temperature is between about —10° C. and about 10° C.

3. A process as recited in claim 2 wherein said premix is held at said temperature of between about —10° C. and 10° C. for about two to six hours.

4. A process as recited in claim 1 where $x$ is 1.

5. A process as recited in claim 4 wherein said Ar group is phenyl.

6. A process as recited in claim 1 wherein said halogen is chlorine.

7. A process as recited in claim 1 wherein said alcohol is methanol.

8. A process as recited in claim 1 wherein said inert solvent is toluene.

9. A process as recited in claim 1 wherein said aryl phosphorohalidate is diphenyl phosphorochloridate.

10. A process as recited in claim 1 wherein said process is conducted as a continuous reaction.

11. A process as recited in claim 1 wherein said alcohol is isodecyl alcohol.

12. A process as recited in claim 11 wherein said solvent is n-hepane.

References Cited
UNITED STATES PATENTS

| | | | |
|---|---|---|---|
| 2,971,974 | 2/1961 | Blair | 260—973 X |
| 3,042,697 | 7/1962 | Halter et al. | 260—973 X |

LEWIS GOTTS, Primary Examiner

R. L. RAYMOND, Assistant Examiner

U.S. Cl. X.R.

260—983